US010436633B2

(12) United States Patent
Buckley

(10) Patent No.: US 10,436,633 B2
(45) Date of Patent: Oct. 8, 2019

(54) MOTION SENSOR LENS STRUCTURE FOR A BUILDING CONTROLLER

(71) Applicant: Honeywell International Inc., Morris Plains, NJ (US)

(72) Inventor: Mark C. Buckley, Camino, CA (US)

(73) Assignee: Honeywell International Inc., Morris Plains, NJ (US)

(*) Notice: Subject to any disclaimer, the term of this patent is extended or adjusted under 35 U.S.C. 154(b) by 0 days.

(21) Appl. No.: 15/818,201

(22) Filed: Nov. 20, 2017

(65) Prior Publication Data
US 2019/0154499 A1 May 23, 2019

(51) Int. Cl.
G01J 1/04 (2006.01)
G02B 1/04 (2006.01)
G02B 3/08 (2006.01)
G02B 7/02 (2006.01)
G01P 13/00 (2006.01)
G01K 13/02 (2006.01)
(Continued)

(52) U.S. Cl.
CPC ........... *G01J 1/0403* (2013.01); *G01J 1/0411* (2013.01); *G01J 1/0437* (2013.01); *G01K 1/14* (2013.01); *G01K 13/02* (2013.01); *G01P 13/00* (2013.01); *G02B 7/026* (2013.01); *G05B 19/048* (2013.01); *G01K 2201/00* (2013.01); *G02B 1/041* (2013.01); *G02B 3/08* (2013.01); *G05B 2219/2614* (2013.01); *G05B 2219/2642* (2013.01)

(58) Field of Classification Search
CPC .............. F16B 2001/0028; F16B 1/00; G05B 2219/2614; G05B 2219/2642; G01P 13/00; G02B 1/041; G02B 7/026; G01J 1/0411; G01J 1/0403; G01J 1/0437
See application file for complete search history.

(56) References Cited

U.S. PATENT DOCUMENTS 4,604,524 A 8/1986 Kotlicki et al.
5,577,779 A * 11/1996 Dangel ............... E05C 19/06
220/326
(Continued)

OTHER PUBLICATIONS

Erhard, Gunter. (2006). Designing with Plastics. (pp. 323). Hanser Publishers. Retrieved from https://app.knovel.com/hotlink/toc/id:kpDP000002/designing-with-plastics/designing-with-plastics (Year: 2006).*

(Continued)

*Primary Examiner* — Thomas C Lee
*Assistant Examiner* — Charles Cai
(74) *Attorney, Agent, or Firm* — Seager Tufte & Wickhem LLP

(57) ABSTRACT

A building controller includes a controller that is operatively coupled to a motion sensor and provides one or more control signals based at least in part on the motion sensed by the motion sensor. A lens member includes a HDPE (high density polyethylene) lens and a lens mounting structure that includes a lens retention hook. A bracket defines an aperture in registration with the motion sensor and further defines a lens securement aperture configured to accommodate the lens retention hook. The bracket may also define a lens securement spring configured to provide a biasing force to the lens retention hook of the lens mounting structure.

20 Claims, 10 Drawing Sheets

(51) Int. Cl.
    *G01K 1/14*           (2006.01)
    *G05B 19/048*       (2006.01)

(56) References Cited

U.S. PATENT DOCUMENTS

| | | | | |
|---|---|---|---|---|
| 6,121,876 | A * | 9/2000 | McKenney | G08B 13/193 |
| | | | | 250/353 |
| 6,948,692 | B2 | 9/2005 | Leachman | |
| 2012/0176668 | A1 * | 7/2012 | Saito | G02B 1/04 |
| | | | | 359/357 |
| 2013/0338839 | A1 * | 12/2013 | Rogers | G05D 23/1904 |
| | | | | 700/278 |

OTHER PUBLICATIONS

Snap fit, power point document, downloaded May 11, 2017, pp. 1-17.
Explore Plastic Injection, Sheet Metal, and more!, Bildergebnis für snap fit | Mechanical Engineering | Pinterest | Fit, Search and Craft, https://in.pinterest.com/pin/365002744786434665/, Dec. 8, 2017.
Snap fit—Google Search, https://www.google.co.in/search?q=snap+fit&source=lnms&tbm=isch&s, Dec. 8, 2017.

* cited by examiner

MOTION SENSOR LENS STRUCTURE FOR A BUILDING CONTROLLER

TECHNICAL FIELD

The present disclosure relates to building controllers, and more particularly to building controllers that include motion sensing.

BACKGROUND

Building controllers are used to regulate operation of a variety of different building systems, such as but not limited to security systems, lighting systems and Heating, Ventilation, and/or Air Conditioning (HVAC) systems. HVAC systems are often used to control the comfort level within a building or other structure. Such HVAC systems typically include an HVAC controller that controls various HVAC components of the HVAC system in order to affect and/or control one or more environmental conditions within the building. In many cases, the HVAC controller is mounted within the building and provides control signals to various HVAC components of the HVAC system. Improvements in the hardware, user experience, and functionality of such HVAC controllers would be desirable.

SUMMARY

This disclosure relates generally to a building controller that include an IR sensor for detecting motion relative to the building controller. In some cases, the building controller may be an HVAC controller and/or thermostat, although this is not required. In a particular example of the disclosure, a thermostat may be configured to provide one or more control signals to a building control system. The illustrative thermostat may include a housing and a user interface that is accessible from outside of the housing. A printed circuit board is situated inside of the housing and a motion sensor for sensing motion is mounted to the printed circuit board. The thermostat may include a temperature sensor for sensing a temperature and a memory for storing a temperature setpoint. A controller is operatively coupled to the user interface, the memory, the temperature sensor and the motion sensor, and is configured to provide one or more control signals to the building control system that are based at least in part on the temperature setpoint, the temperature sensed by the temperature sensor, and the motion sensed by the motion sensor. The thermostat includes a lens member including a lens and a lens mounting structure, the lens member mounted with the lens exposed to outside of the housing and positioned in front of the motion sensor. The lens member is formed of high density polyethylene (HDPE) and the lens is configured to direct incoming electromagnetic radiation to the motion sensor. The thermostat includes a bracket that is situated inside of the housing and that defines an aperture in registration with the motion sensor for passing incoming electromagnetic radiation from the lens to the motion sensor, the aperture defined by side walls that are stepped to reduce unwanted reflections from reaching the motion sensor. The bracket further defines a lens securement aperture and a lens securement spring. The lens mounting structure includes a side wall that extends back from the lens and engages a front side of the bracket and a lens retention hook that extends back from the side wall and through the lens securement aperture of the bracket and engages a back side of the bracket, wherein the lens securement spring of the bracket is configured to keep the lens retention hook in position against the back side of the bracket.

In another example of the disclosure, an apparatus may be configured to sense occupancy for controlling a building automation system. The building controller may include a housing and a motion sensor for sensing motion in front of the housing. A controller is operatively coupled to the motion sensor and is configured to provide one or more control signals for use by the building automation system that are based at least in part on the motion sensed by the motion sensor. A lens member includes a lens and a lens mounting structure. The lens member is mounted with the lens exposed to outside of the housing and is positioned in front of the motion sensor. The lens is formed of high density polyethylene (HDPE) and is configured to direct incoming infra-red (IR) electromagnetic radiation to the motion sensor. A bracket is situated inside of the housing and defines an aperture in registration with the motion sensor for passing incoming IR electromagnetic radiation from the lens to the motion sensor. The bracket also defines a lens securement aperture and a lens securement spring. The lens mounting structure includes a lens retention hook that extends backward from the lens and through the lens securement aperture to engage a back side of the bracket. The lens securement spring is sufficiently resilient to deflect away from the lens retention hook to enable the lens retention hook to extend past the lens securement spring, but is biased into contact with the lens retention hook to keep the lens retention hook engaged with the back side of the bracket.

In another example of the disclosure, a heating, cooling and ventilation (HVAC) controller may be configured to provide one or more control signals to an HVAC system. The illustrative HVAC controller may include a housing, a user interface that is accessible from outside of the housing and a motion sensor for sensing motion in front of the housing. A controller is operatively coupled to the user interface and the motion sensor and is configured to provide one or more control signals to the HVAC system that are based at least in part on the motion sensed by the motion sensor. A bracket is disposable within the housing and defines an infrared light aperture that is configured to permit infrared light to pass through the infrared light aperture, a first lens securement aperture on a first side of the infrared light aperture, a first lens securement spring extending into the first lens securement aperture, a second lens securement aperture on a second side of the infrared light aperture and a second lens securement spring extending into the second lens securement aperture. The motion sensor is secured relative to the bracket and is operably coupled to the controller, the motion sensor configured to detect motion relative to the HVAC controller. A lens is disposed in front of the motion sensor and is configured to direct incoming infra-red light to the motion sensor, the lens including a first lens retention hook that extends into the first lens securement aperture and a second lens retention hook that extends into the second lens securement aperture. The first lens securement spring exerts a biasing force in a first direction against the first lens retention hook and the second lens securement spring exerts a biasing force in a second direction again the second lens retention hook, where the second direction is opposite the first direction.

The preceding summary is provided to facilitate an understanding of some of the features of the present disclosure and is not intended to be a full description. A full appreciation of the disclosure can be gained by taking the entire specification, claims, drawings, and abstract as a whole.

BRIEF DESCRIPTION OF THE DRAWINGS

The disclosure may be more completely understood in consideration of the following description of various illustrative embodiments of the disclosure in connection with the accompanying drawings, in which.

Figure 1:
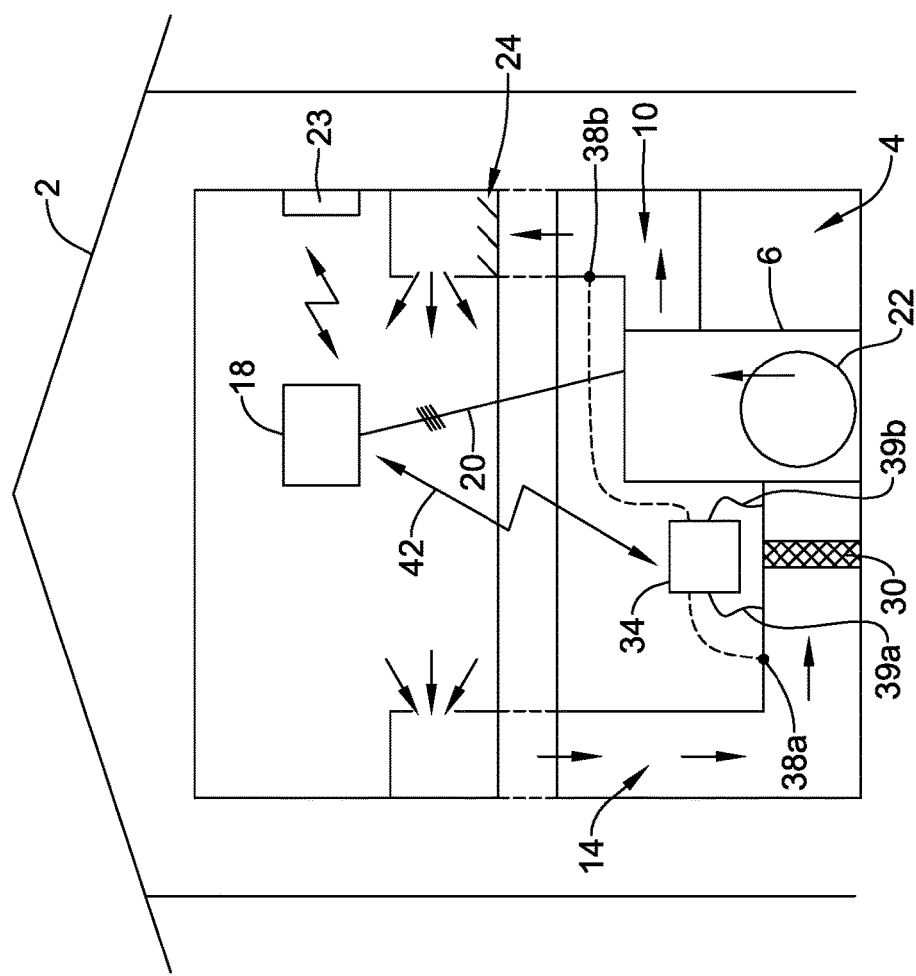
FIG. 1 is a schematic view of an illustrative HVAC system servicing a building or structure.

While the disclosure is amenable to various modifications and alternative forms, specifics thereof have been shown by way of example in the drawings and will be described in detail. It should be understood, however, that the intention is not to limit aspects of the disclosure to the particular illustrative embodiments described. On the contrary, the intention is to cover all modifications, equivalents, and alternatives falling within the spirit and scope of the disclosure.

DESCRIPTION

For the following defined terms, these definitions shall be applied, unless a different definition is given in the claims or elsewhere in this specification. All numeric values are herein assumed to be modified by the term "about," whether or not explicitly indicated. The term "about" generally refers to a range of numbers that one of skill in the art would consider equivalent to the recited value (i.e., having the same function or result). In many instances, the terms "about" may include numbers that are rounded to the nearest significant figure.

The recitation of numerical ranges by endpoints includes all numbers within that range (e.g. 1 to 5 includes 1, 1.5, 2, 2.75, 3, 3.80, 4, and 5).

As used in this specification and the appended claims, the singular forms "a", "an", and "the" include plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include one or more particular features, structures, and/or characteristics. However, such recitations do not necessarily mean that all embodiments include the particular features, structures, and/or characteristics. Additionally, when particular features, structures, and/or characteristics are described in connection with one embodiment, it should be understood that such features, structures, and/or characteristics may also be used connection with other embodiments whether or not explicitly described unless clearly stated to the contrary.

The present disclosure is directed generally at building automation systems. Building automation systems are systems that control one or more operations of a building. Building automation systems can include HVAC systems, security systems, fire suppression systems, energy management systems and other systems. While HVAC systems with HVAC controllers are used as an example below, it should be recognized that the concepts disclosed herein can be applied to building automation systems more generally.

FIG. 1 is a schematic view of a building 2 having an illustrative heating, ventilation, and air conditioning (HVAC) system 4. While FIG. 1 shows a typical forced air type HVAC system, other types of HVAC systems are contemplated including, but not limited to, boiler systems, radiant heating systems, electric heating systems, cooling systems, heat pump systems, and/or any other suitable type of HVAC system, as desired. The illustrative HVAC system 4 of FIG. 1 includes one or more HVAC components 6, a system of ductwork and air vents including a supply air duct 10 and a return air duct 14, and one or more HVAC controllers 18. The one or more HVAC components 6 may include, but are not limited to, a furnace, a heat pump, an electric heat pump, a geothermal heat pump, an electric heating unit, an air conditioning unit, a humidifier, a dehumidifier, an air exchanger, an air cleaner, a damper, a valve, and/or the like.

It is contemplated that the HVAC controller(s) 18 may be configured to control the comfort level in the building or structure by activating and deactivating the HVAC component(s) 6 in a controlled manner. The HVAC controller(s) 18 may be configured to control the HVAC component(s) 6 via a wired or wireless communication link 20. In some cases, the HVAC controller(s) 18 may be a thermostat, such as, for example, a wall mountable thermostat, but this is not required in all embodiments. Such a thermostat may include (e.g. within the thermostat housing) or have access to one or more temperature sensor(s) for sensing ambient temperature at or near the thermostat. In some instances, the HVAC controller(s) 18 may be a zone controller, or may include multiple zone controllers each monitoring and/or controlling the comfort level within a particular zone in the building or other structure.

In the illustrative HVAC system 4 shown in FIG. 1, the HVAC component(s) 6 may provide heated air (and/or cooled air) via the ductwork throughout the building 2. As illustrated, the HVAC component(s) 6 may be in fluid communication with every room and/or zone in the building 2 via the ductwork 10 and 14, but this is not required. In operation, when a heat call signal is provided by the HVAC controller(s) 18, an HVAC component 6 (e.g. forced warm air furnace) may be activated to supply heated air to one or more rooms and/or zones within the building 2 via supply air ducts 10. The heated air may be forced through supply air duct 10 by a blower or fan 22. In this example, the cooler air from each zone may be returned to the HVAC component 6 (e.g. forced warm air furnace) for heating via return air ducts 14. Similarly, when a cool call signal is provided by the HVAC controller(s) 18, an HVAC component 6 (e.g. air conditioning unit) may be activated to supply cooled air to one or more rooms and/or zones within the building or other structure via supply air ducts 10. The cooled air may be forced through supply air duct 10 by the blower or fan 22. In this example, the warmer air from each zone may be returned to the HVAC component 6 (e.g. air conditioning unit) for cooling via return air ducts 14. In some cases, the HVAC system 4 may include an internet gateway or other device 23 that may allow one or more of the HVAC components, as described herein, to communicate over a wide area network (WAN) such as, for example, the Internet.

In some cases, the system of vents or ductwork 10 and/or 14 can include one or more dampers 24 to regulate the flow of air, but this is not required. For example, one or more dampers 24 may be coupled to one or more HVAC controller(s) 18, and can be coordinated with the operation of one or more HVAC components 6. The one or more HVAC controller(s) 18 may actuate dampers 24 to an open position, a closed position, and/or a partially open position to modulate the flow of air from the one or more HVAC components to an appropriate room and/or zone in the building or other structure. The dampers 24 may be particularly useful in zoned HVAC systems, and may be used to control which zone(s) receives conditioned air from the HVAC component(s) 6.

In many instances, one or more air filters 30 may be used to remove dust and other pollutants from the air inside the building 2. In the illustrative example shown in FIG. 1, the air filter(s) 30 is installed in the return air duct 14, and may filter the air prior to the air entering the HVAC component 6, but it is contemplated that any other suitable location for the air filter(s) 30 may be used. The presence of the air filter(s) 30 may not only improve the indoor air quality, but may also protect the HVAC components 6 from dust and other particulate matter that would otherwise be permitted to enter the HVAC component.

In some cases, and as shown in FIG. 1, the illustrative HVAC system 4 may include an equipment interface module (EIM) 34. When provided, the equipment interface module 34 may, in addition to controlling the HVAC sometimes under the direction of the thermostat, be configured to measure or detect a change in a given parameter between the return air side and the discharge air side of the HVAC system 4. For example, the equipment interface module 34 may measure a difference in temperature, flow rate, pressure, or a combination of any one of these parameters between the return air side and the discharge air side of the HVAC system 4. In some cases, the equipment interface module 34 may be adapted to measure the difference or change in temperature (delta T) between a return air side and discharge air side of the HVAC system 4 for the heating and/or cooling mode. The delta T for the heating and cooling modes may be calculated by subtracting the return air temperature from the discharge air temperature (e.g. delta T=discharge air temperature−return air temperature)

In some cases, the equipment interface module 34 may include a first temperature sensor 38a located in the return (incoming) air duct 14, and a second temperature sensor 38b located in the discharge (outgoing or supply) air duct 10. Alternatively, or in addition, the equipment interface module 34 may include a differential pressure sensor including a first pressure tap 39a located in the return (incoming) air duct 14, and a second pressure tap 39b located downstream of the air filter 30 to measure a change in a parameter related to the amount of flow restriction through the air filter 30. In some cases, the equipment interface module 34, when provided, may include at least one flow sensor that is capable of providing a measure that is related to the amount of air flow restriction through the air filter 30. In some cases, the equipment interface module 34 may include an air filter monitor. These are just some examples.

When provided, the equipment interface module 34 may be configured to communicate with the HVAC controller 18 via, for example, a wired or wireless communication link 42. In other cases, the equipment interface module 34 may be incorporated or combined with the HVAC controller 18. In some instances, the equipment interface module 34 may communicate, relay or otherwise transmit data regarding the selected parameter (e.g. temperature, pressure, flow rate, etc.) to the HVAC controller 18. In some cases, the HVAC controller 18 may use the data from the equipment interface module 34 to evaluate the system's operation and/or performance. For example, the HVAC controller 18 may compare data related to the difference in temperature (delta T) between the return air side and the discharge air side of the HVAC system 4 to a previously determined delta T limit stored in the HVAC controller 18 to determine a current operating performance of the HVAC system 4.

Figure 2:
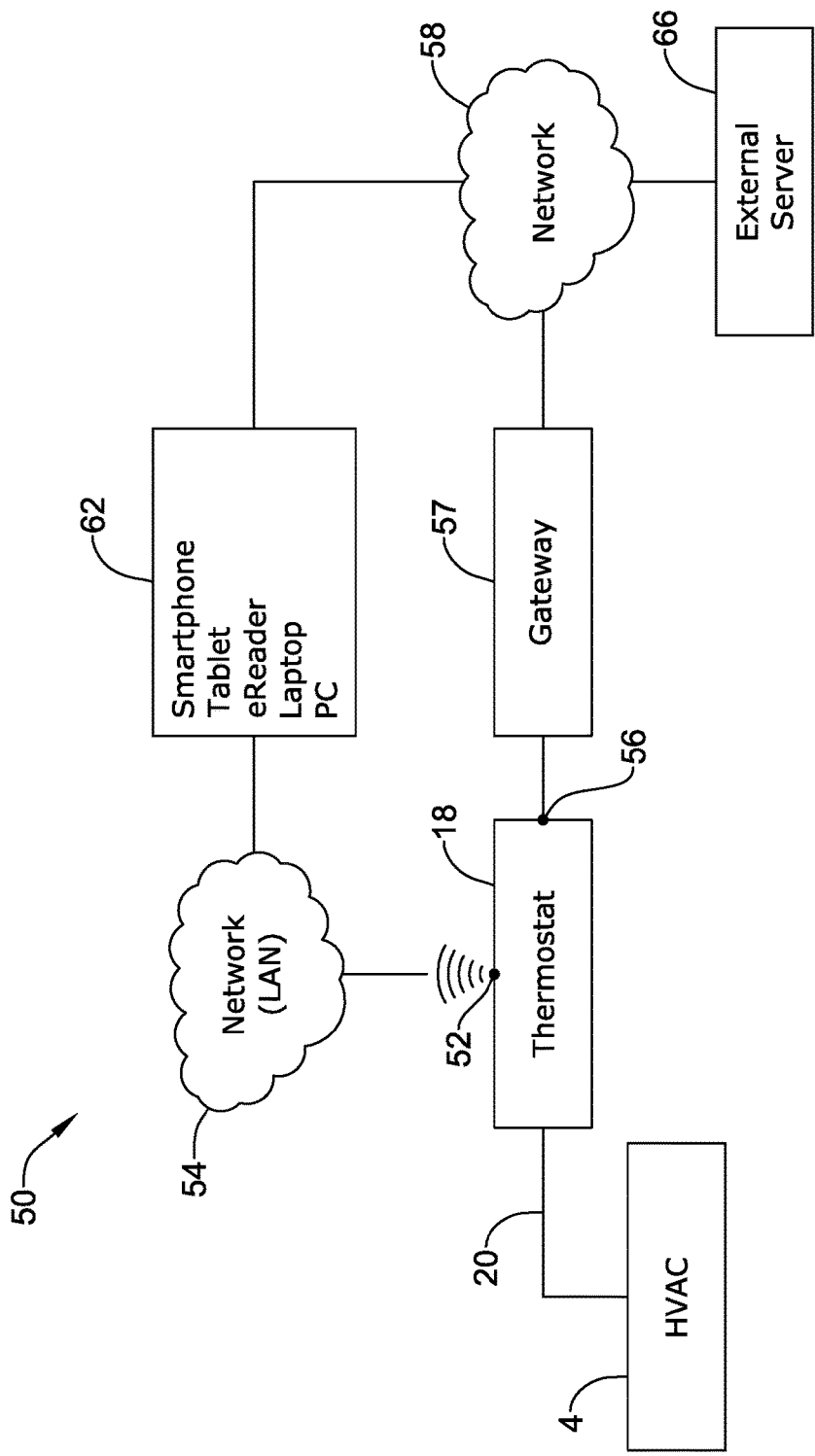
FIG. 2 is a schematic view of an illustrative HVAC control system that may facilitate access and/or control of the HVAC system of FIG. 1.

FIG. 2 is a schematic view of an illustrative HVAC control system 50 that facilitates remote access and/or control of the illustrative HVAC system 4 shown in FIG. 1. The HVAC control system 50 may be considered a building automation system or part of a building automation system. The illustrative HVAC control system 50 includes an HVAC controller, as for example, HVAC controller 18 (see FIG. 1) that is configured to communicate with and control one or more HVAC components 6 of the HVAC system 4. As discussed above, the HVAC controller 18 may communicate with the one or more HVAC components 6 of the HVAC system 4 via a wired or wireless link 20. Additionally, the HVAC controller 18 may communicate over one or more wired or wireless networks that may accommodate remote access and/or control of the HVAC controller 18 via another device such as a smart phone, tablet, e-reader, laptop computer, personal computer, key fob, or the like. As shown in FIG. 2, the HVAC controller 18 may include a first communications port 52 for communicating over a first network 54, and in some cases, a second communications port 56 for communicating over a second network 58. In some cases, communications over a second network 58 may pass through a gateway 57, but this is not required in all cases. In some cases, the first network 54 may be a wireless local area network (LAN), and the second network 58 (when provided) may be a wide area network or global network (WAN) including, for example, the Internet. In some cases, the wireless local area network 54 may provide a wireless access point and/or a network host device that is separate from the HVAC controller 18. In other cases, the wireless local area network 54 may provide a wireless access point and/or a network host device that is part of the HVAC controller 18. In some cases, the wireless local area network 54 may include a local domain name server (DNS), but this is not required for all embodiments. In some cases, the wireless local area network 54 may be an ad-hoc wireless network, but this is not required.

In some cases, the HVAC controller 18 may be programmed to communicate over the second network 58 with an external web service hosted by one or more external web server(s) 66. A non-limiting example of such an external web service is Honeywell's TOTAL CONNECT™ web service. The HVAC controller 18 may be configured to upload selected data via the second network 58 to the external web service where it may be collected and stored on the external web server 66. In some cases, the data may be indicative of the performance of the HVAC system 4.

Additionally, the HVAC controller 18 may be configured to receive and/or download selected data, settings and/or services sometimes including software updates from the external web service over the second network 58. The data, settings and/or services may be received automatically from the web service, downloaded periodically in accordance with a control algorithm, and/or downloaded in response to a user request. In some cases, for example, the HVAC controller 18 may be configured to receive and/or download an HVAC operating schedule and operating parameter settings such as, for example, temperature set points, humidity set points, start times, end times, schedules, window frost protection settings, and/or the like from the web server 66 over the second network 58. In some instances, the HVAC controller 18 may be configured to receive one or more user profiles having at least one operational parameter setting that is selected by and reflective of a user's preferences. In still other instances, the HVAC controller 18 may be configured to receive and/or download firmware and/or hardware updates such as, for example, device drivers from the web server 66 over the second network 58. Additionally, the HVAC controller 18 may be configured to receive local weather data, weather alerts and/or warnings, major stock index ticker data, traffic data, and/or news headlines over the second network 58. These are just some examples.

Depending upon the application and/or where the HVAC user is located, remote access and/or control of the HVAC controller 18 may be provided over the first network 54 and/or the second network 58. A variety of remote wireless devices 62 may be used to access and/or control the HVAC controller 18 from a remote location (e.g. remote from the HVAC Controller 18) over the first network 54 and/or second network 58 including, but not limited to, mobile phones including smart phones, tablet computers, laptop or personal computers, wireless network-enabled key fobs, e-readers, and/or the like. In many cases, the remote wireless devices 62 are configured to communicate wirelessly over the first network 54 and/or second network 58 with the HVAC controller 18 via one or more wireless communication protocols including, but not limited to, cellular communication, ZigBee, REDLINK™, Bluetooth, WiFi, IrDA, dedicated short range communication (DSRC), EnOcean, and/or any other suitable common or proprietary wireless protocol, as desired.

In some cases, an application program code (i.e. app) stored in the memory of the remote device 62 may be used to remotely access and/or control the HVAC controller 18. The application program code (app) may be downloaded from an external web service, such as the web service hosted by the external web server 66 (e.g. Honeywell's TOTAL CONNECT™ web service) or another external web service (e.g. ITUNES® or Google Play). In some cases, the app may provide a remote user interface for interacting with the HVAC controller 18 at the user's remote device 62. For example, through the user interface provided by the app, a user may be able to change operating parameter settings such as, for example, temperature set points, humidity set points, start times, end times, schedules, window frost protection settings, accept software updates and/or the like. Communications may be routed from the user's remote device 62 to the web server 66 and then, from the web server 66 to the HVAC controller 18. In some cases, communications may flow in the opposite direction such as, for example, when a user interacts directly with the HVAC controller 18 to change an operating parameter setting such as, for example, a schedule change or a set point change. The change made at the HVAC controller 18 may be routed to the web server 66 and then from the web server 66 to the remote device 62 where it may be reflected by the application program executed by the remote device 62.

In some cases, a user may be able to interact with the HVAC controller 18 via a user interface provided by one or more web pages served up by the web server 66. The user may interact with the one or more web pages using a variety of internet capable devices to effect a setting or other change at the HVAC controller 18, and in some cases view usage data and energy consumption data related to the usage of the HVAC system 4. In some cases, communication may occur between the user's remote device 62 and the HVAC controller 18 without being relayed through a server such as external server 66. These are just some examples.

Figure 3:
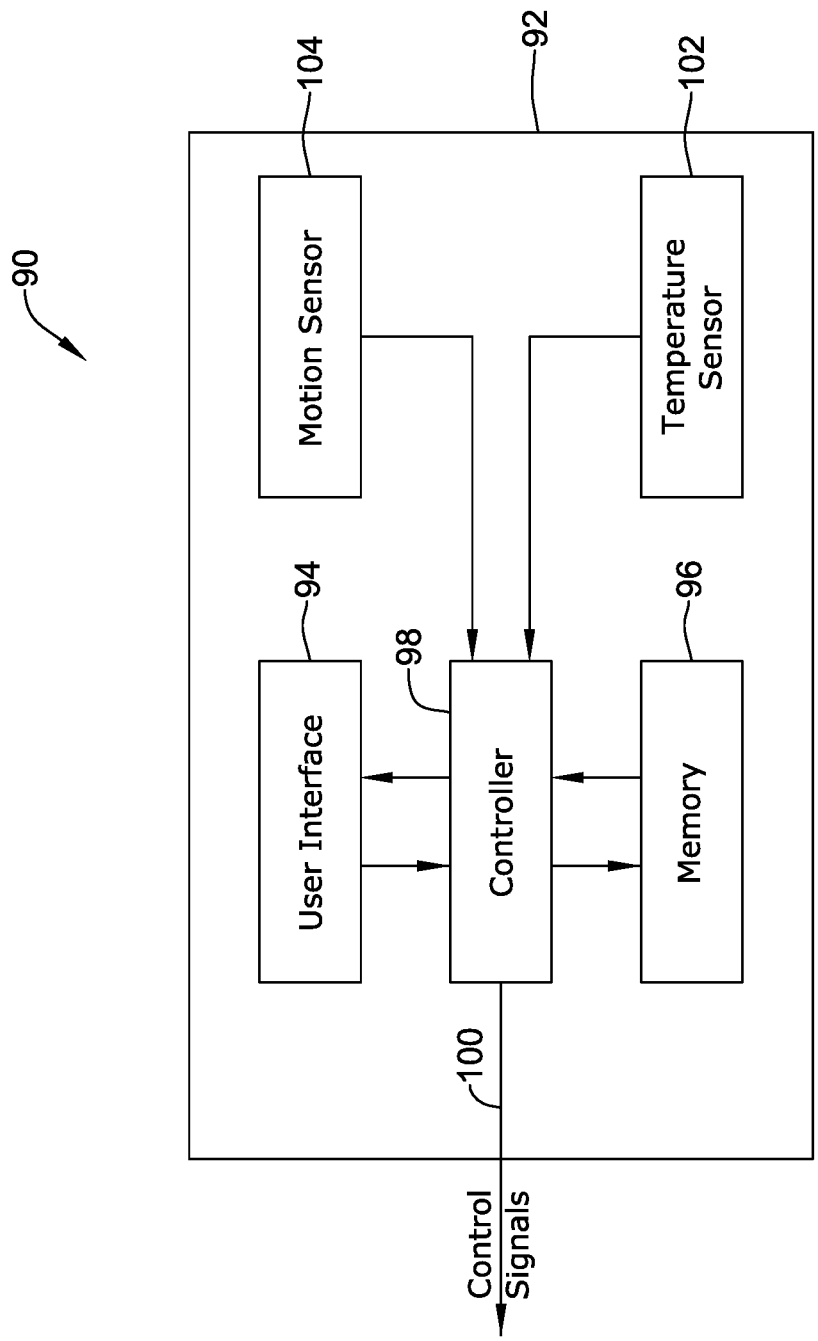
FIG. 3 is a schematic view of an illustrative HVAC controller that may, for example, form a part of the HVAC system of FIG. 1 or FIG. 2.

FIG. 3 is a schematic view of an illustrative HVAC controller 90 that may, for example, be configured to control one or more HVAC components (such as but not limited to the HVAC component(s) 6 shown in FIG. 1 as part of the HVAC system 4) in accordance with a temperature setpoint. In some cases, the HVAC controller 90 may be configured to control one or more HVAC components in accordance with a programmable schedule. In some cases, the programmable schedule may include a plurality of schedule periods. For example, in some cases, the programmable schedule may include up to four (or more) different time periods each day. In some cases, these four time periods may be identified as WAKE, AWAY, HOME and SLEEP. In some instances, the programmable schedule may include additional time periods. In some cases, the programmable schedule may include fewer than four distinct time periods.

In some cases, the programmable schedule may be known as a 7 day schedule, in which each of the seven days of the week may be uniquely programmed but are not required to be. In some cases, the programmable schedule may be known as a 5-2 schedule, in which each of the weekdays Monday through Friday share a first programming schedule and the weekend days Saturday and Sunday share a second programming schedule. In some cases, the programmable schedule may be known as a 5-1-1 schedule, in each of the weekdays Monday through Friday share a first programming schedule, and Saturday and Sunday each can have their own unique schedule.

In some cases, the HVAC controller 90 may include a housing 92. In some instances, the housing 92 may be considered as forming at least a portion of the outer structure of the HVAC controller 90. In some cases, the housing 92 may include one, two or more distinct housing portions, as desired. A user interface 94 may be disposed within the housing 92 and may be accessible by a user from outside of the housing 92. In some cases, the user interface 94 may include a touch screen display. In some cases, the user interface 94 may include a non-touch sensitive liquid crystal display panel in combination with one or more electromechanical switches. The HVAC controller 90 may also include a memory 96 that may be configured to store a temperature setpoint and/or details of a programmable schedule. In some instances, the memory 96 may store additional information as well. A controller 98 may be operably coupled to the memory 96 and to the user interface 94. In some cases, the controller 98 is configured to provide control signals 100 for controlling the one or more HVAC components, sometimes in accordance with the programmable schedule that is stored in the memory 96. The HVAC controller 90 may include a temperature sensor 102, and the controller 98 may receive a temperature signal from the temperature sensor 102 and may provide control signals 100 in accordance with both a stored temperature setpoint, which may be part of the programmable schedule or may be a stand-alone temperature setpoint.

In some cases, as shown, the HVAC controller 90 may include a motion sensor 104 that is configured to sense motion in front of the HVAC controller 90. In some instances, for example, this may enable the HVAC controller 90 to detect the approach of an individual towards the HVAC controller 90, where the individual appears to be heading towards the HVAC controller 90 with the intent of interacting with the HVAC controller 90. In some cases, this intended interaction may simply be that the user desires to check a current setting of the HVAC controller 90, for example. In some instances, this intended interaction may instead include that the user desires to change or modify one or more current settings, or to edit the programmable schedule, for example. In either event, the motion sensor 104 may signal the controller 98 to wake up the user interface 94 so that the HVAC controller 90 will be ready to do whatever the approaching user desires to do once the approaching user is close enough to the HVAC controller 90 to engage the user interface 94. In some cases, the motion sensor 104 may be used to detect occupancy of the building. When occupancy is detected by the motion sensor, the controller may automatically switch to the "HOME" or a comfort setting. When occupancy is not detected for a period of time by the motion sensor, the controller may automatically switch to the "AWAY", "SLEEP" or an energy saving setting. These are just example applications of the motion sensor 104.

In some cases, the motion sensor 104 may be configured to be sensitive to the infrared band, and thus may sense motion in the infrared band. In some instances, the motion sensor 104 may be configured to be sensitive to the far infrared band, and thus may sense motion in the far infrared band. In some cases, the controller 98 may be configured to provide control signals 100 that are based at least in part upon the motion sensed by the motion sensor 104. In some cases, the controller 98 may be configured to provide control signals 100 that are based at least in part upon a temperature setpoint (stored in the memory 96), a temperature sensed by the temperature sensor 102 and the motion sensed by the motion sensor 104.

In some cases, the HVAC controller 90 shown in FIG. 3 may not include the user interface 94 or the temperature sensor 102. In some cases, the HVAC controller 90 may also lack the memory 96. In some instances, the HVAC controller 90 may be configured to simply determine occupancy of a space by sensing motion near the HVAC controller 90, for example, and to transmit (wired or wirelessly) an indication of the sensed motion to a remote HVAC controller that may include the user interface 94 and/or the temperature sensor 102 and may be configured to operate the HVAC system 4 (FIG. 1) in accordance with a temperature setpoint, a current temperature and an indication of motion received. When so provided, the HVAC controller 90 may be considered a motion sensor rather than an "HVAC controller". It is contemplated that such a motion sensor may include a structure similar to that shown and described with respect to FIGS. 7-10. It will be appreciated that such a motion sensor may function to provide an indication of occupancy to any suitable building automation system, such as an HVAC system, a lighting system and/or a security system. In some cases, a building or building space may include a number of such motion sensors, each reporting back to a building automation controller, so that the building automation controller, upon being informed of occupancy (determined by detected motion), may operate accordingly (e.g. change to an Occupied or Awake state).

Figure 4:
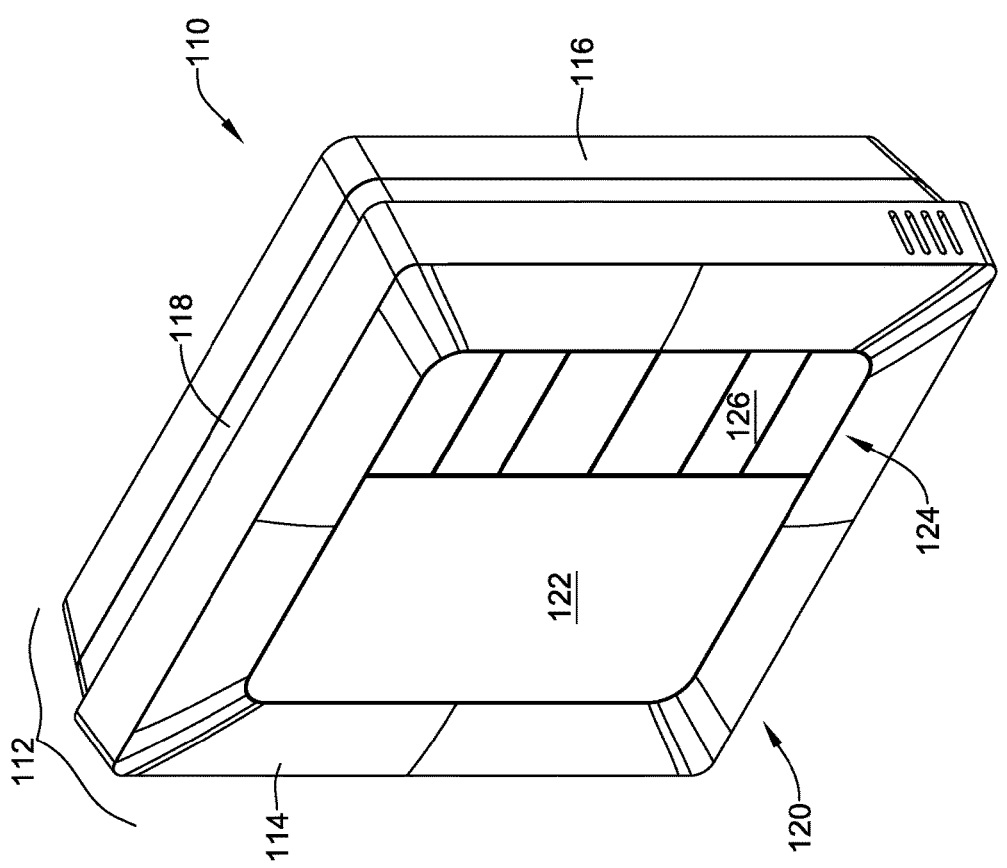
FIG. 4 is a perspective view of an illustrative thermostat that may be used in the HVAC system of FIG. 1 or FIG. 2.

FIG. 4 is a perspective view of a thermostat 110 that may be considered as being an example of the HVAC controller 90 (FIG. 3). The illustrative thermostat 110 includes a housing 112 that may be a unitary housing or may include two or more distinct housing sections. In some cases, as illustrated, the housing 112 may include a front housing section 114, a back housing section 116 and an intermediate housing section 118. The illustrative thermostat 110 also includes a user interface 120 that may be considered as being an example of the user interface 94 (FIG. 3). In some cases, the user interface 120 may be a touch screen display. In some cases, the user interface 120 may include a display 122 and a series of electromechanical buttons 124. Each of the individual electromechanical buttons 124 may be assigned to a particular function. For example, a particular electromechanical button 124 may be used to increase a temperature setpoint, for example, while another electromechanical button 124 may be used to decrease a temperature setpoint. One or more of the electromechanical buttons 124 may be used to adjust fan speed or fan settings. In some cases, one or more of the electromechanical buttons 124 may be used to change a system mode between HEAT, COOL and OFF, for example. In some cases, each of the electromechanical buttons 124 may have a particular assigned function. In some cases, it is contemplated that the particular function of each of the electromechanical buttons 124 may be adjustable or programmable, and may for example be assignable by the controller 98 (FIG. 3) and/or user.

Figure 5:
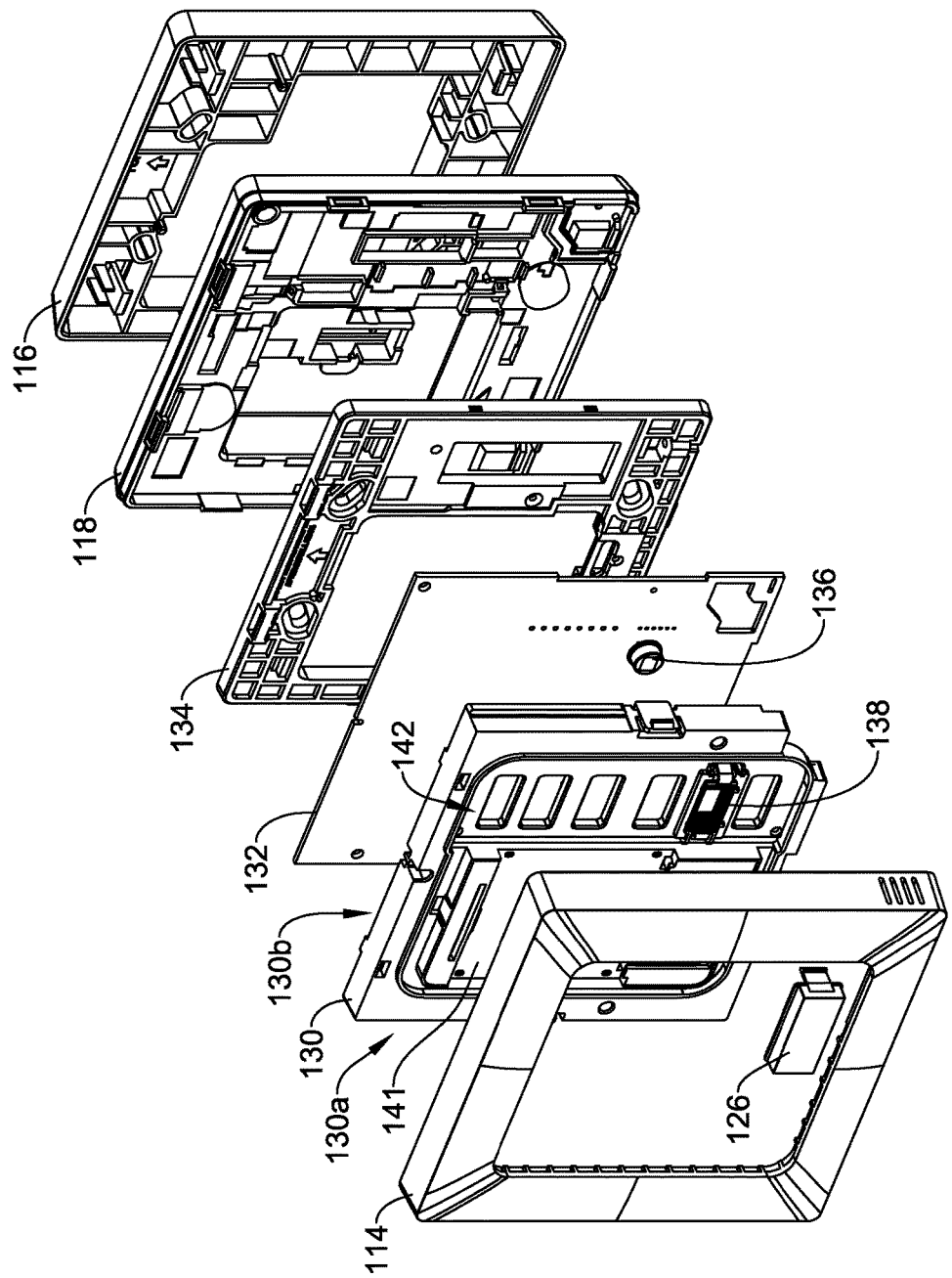
FIG. 5 is an exploded perspective view of the illustrative thermostat of FIG. 4.

In some cases, the thermostat 110 may include a lens member 126. In some instances, as will be discussed, the lens member 126 may be disposed in front of the motion sensor 104 (FIG. 3). FIG. 5 is an exploded perspective view of the thermostat 110, revealing some of the internal details of the thermostat 110. It will be appreciated that some features, such as details of the user interface 120, as well as the electromechanical buttons 124, are not included in this view for clarity. Behind the front housing section 114, in order from front to back (in the illustrated orientation), are a bracket 130, a printed circuit board 132, a sub-structure 134, the intermediate housing section 118 and the back housing section 116. In some cases, the printed circuit board 132 is securable to the bracket 130. In some cases, the printed circuit board 132 is held in place between the bracket 130 and the sub-structure 134. In some instances, as shown, a motion sensor 136 is secured to the printed circuit board 132 at a position where the motion sensor 136 is in registration with an aperture 138 defined by and through the bracket 130. In some cases, additional electronic components of the HVAC controller 90, such as but not limited to the memory 96, the controller 98 and the temperature sensor 102 may be secured relative to the printed circuit board 132 or disposed elsewhere within the HVAC controller 90. Further details regarding the aperture 138 are illustrated in subsequent Figures.

It will be appreciated that the bracket 130 has a front side 130a and a back side 130b. In some cases, the back side 130b may be configured to accept the printed circuit board 132 while the front side 130a may be configured to accommodate one or more elements and features of the user interface 120 (not shown in FIG. 5 for clarity). For example, the front side 130a may include a region 141 that may be configured to accommodate a thin panel display such as a LCD and a region 142 that accommodates the electromechanical buttons 124 (FIG. 4). In some instances, if for example the user interface 120 includes a touch screen display, the front side 130a of the bracket 130 may be modified in order to accommodate such an implementation.

Figure 6:
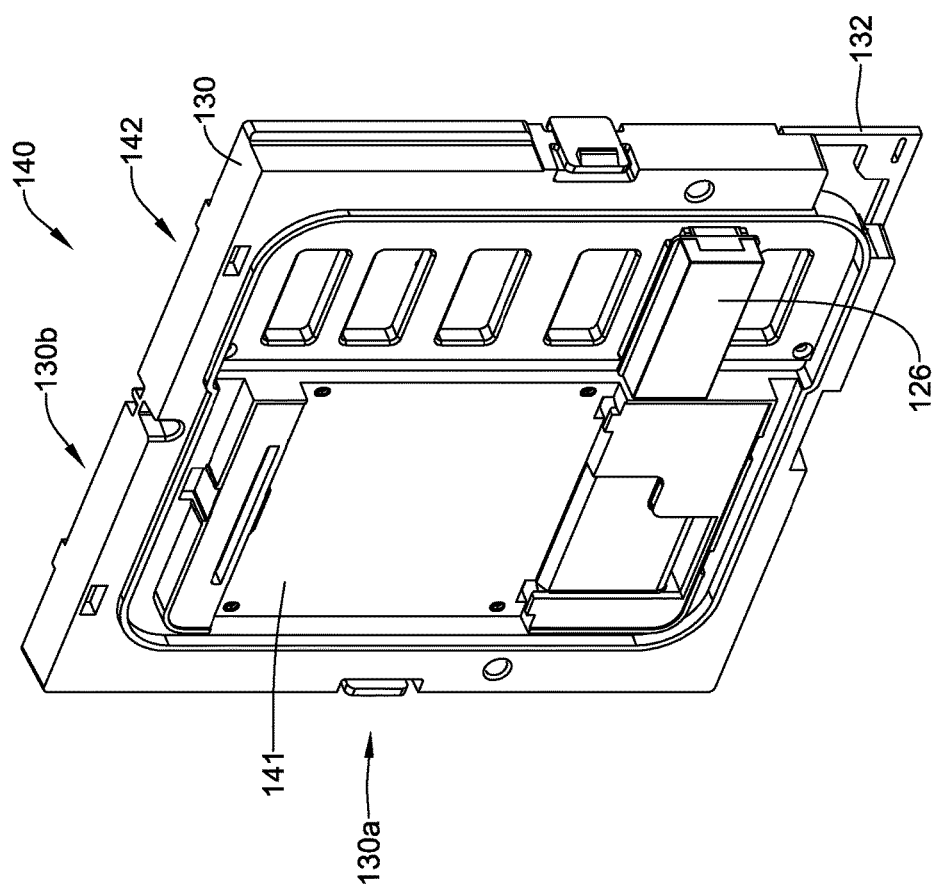
FIG. 6 is a perspective view of a portion of the illustrative thermostat of FIG. 4.
Figure 7:
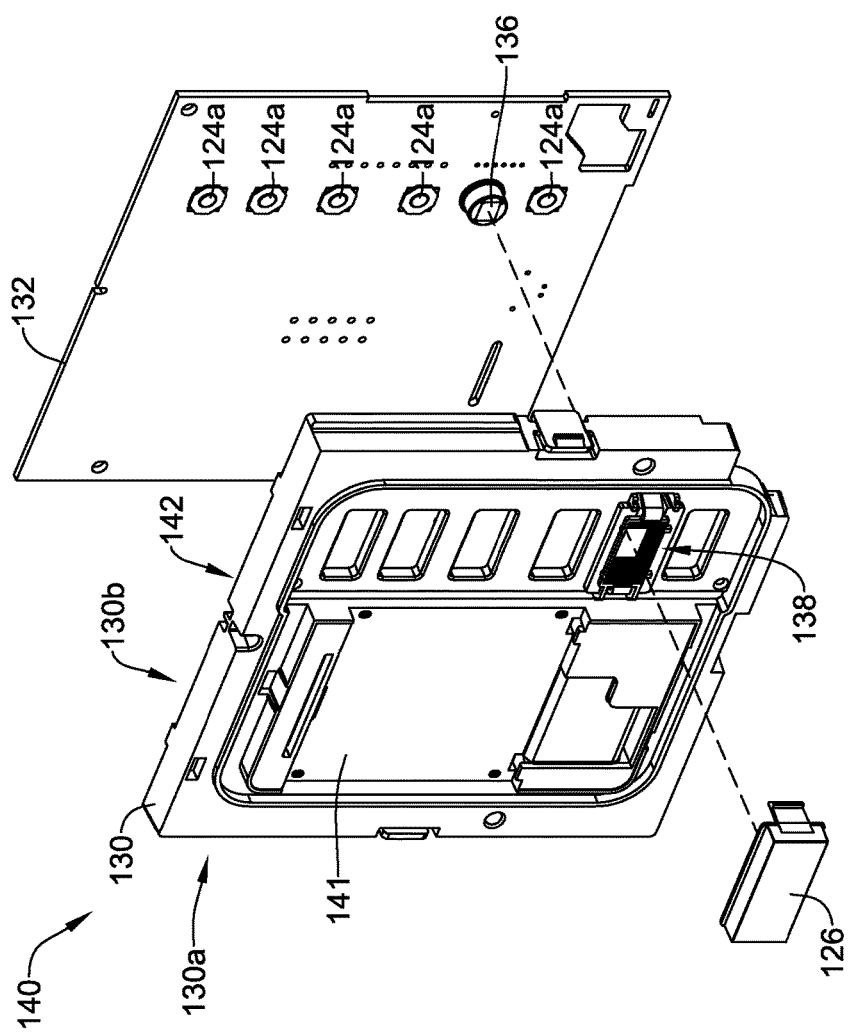
FIG. 7 is an exploded perspective view of the portion of the illustrative thermostat shown in FIG. 6.

FIG. 6 is a perspective view of an assembly 140 and FIG. 7 is an exploded perspective view thereof. The assembly 140 includes the lens member 126 secured to the front side 130*a* of the bracket 130 proximate the aperture 138, and the printed circuit board 132 secured to the back side 130*b* of the bracket 130. As noted with respect to FIG. 4, the thermostat 110 may include a number of electromagnetic buttons 124. One of the features visible in FIG. 7 are a number of switches 124*a* that are secured to the printed circuit board 132 and that align with the electromagnetic buttons 124. As can be seen in the exploded view of FIG. 7, the aperture 138 aligns with the motion sensor 136 that is secured to the printed circuit board 132. Accordingly, incoming electromagnetic radiation (e.g. IR) may pass through the lens member 126, and may be focused by the lens member 126, prior to passing through the aperture 138 and impinging on the motion sensor 136.

Figure 8:
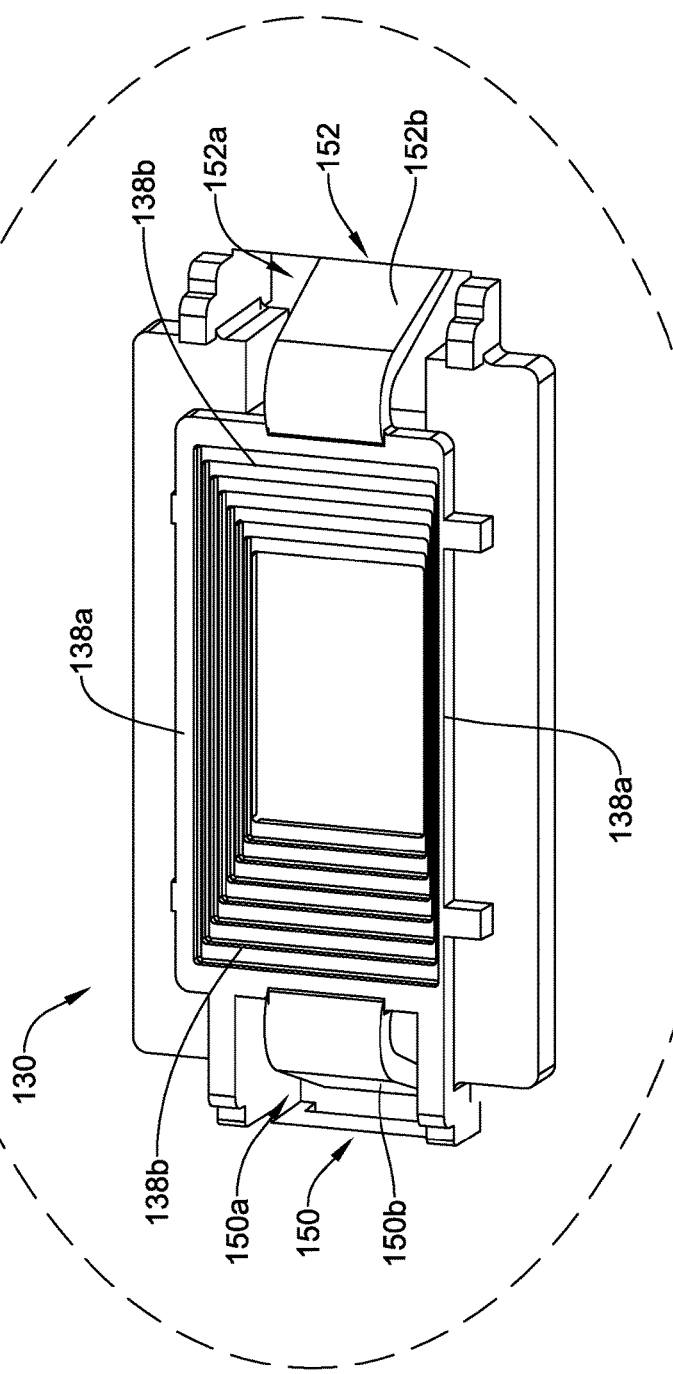
FIG. 8 is a close-up perspective view of a bracket forming part of the portion of the illustrative thermostat shown in FIG. 6.

FIG. 8 provides further details regarding the aperture 138 and the structure of the bracket 130 surrounding the aperture 138. In the example shown, these structures are configured to reduce unwanted internal reflection of electromagnetic radiation (such as infrared radiation), and to help secure the lens member 126 in place relative to the aperture 138. Looking first at reducing unwanted internal reflection, it can be seen that the bracket 130 defines side walls 138*a* and 138*b* that are not angled but rather are stepped. This helps reduce unwanted internal reflection of incident electromagnetic radiation. As illustrated, the side walls 138*a* are parallel to each other and are relatively longer while the side walls 138*b* are parallel to each other (and orthogonal to the side walls 138*a*). As illustrated, the aperture 138, which may also be referred to as a light aperture or an infrared light aperture, is rectangular in shape. In some cases, the aperture 138 may have other shapes, and the configuration of the side walls 138*a*, 138*b* may be modified as desired.

The bracket 130 also defines structures to help secure the lens member 126 in place. In some cases, the bracket 130 may define a first lens securement aperture 150*a* on a first side 150 of the aperture 138 and a second lens securement aperture 152*a* on a second side 152 of the aperture 138. The bracket 130 may also define a first lens securement spring 150*b* on the first side 150 of the aperture 138 and a second lens securement spring 152*b* on the second side 152 of the aperture 138.

Figure 9:
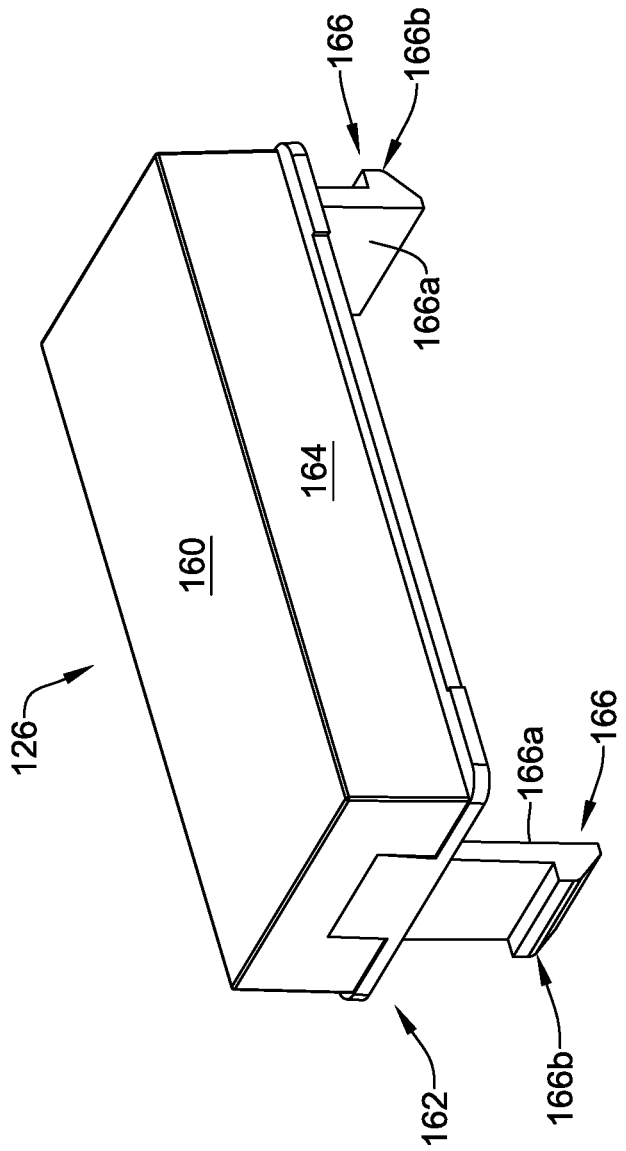
FIG. 9 is a perspective view of a lens forming a portion of the illustrative thermostat of FIG. 4.
Figure 10:
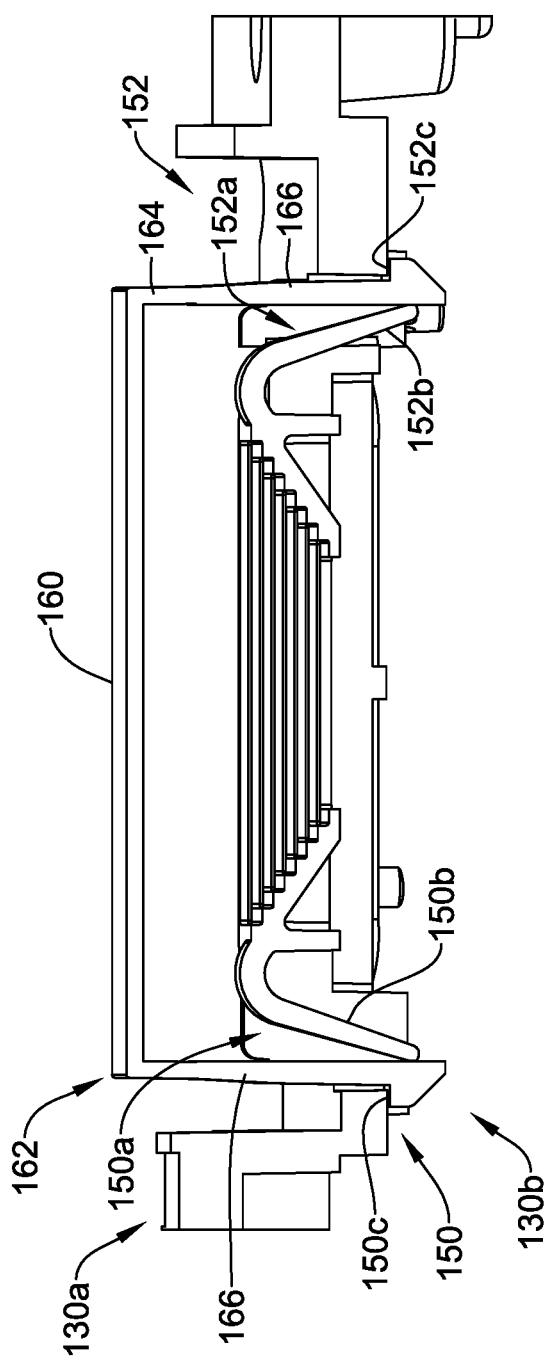
FIG. 10 is a cross-sectional side view of the lens of FIG. 9 in position relative to the mounting bracket of FIG. 8 in accordance with the disclosure.

Turning briefly to FIG. 9, it can be seen that the illustrative lens member 126 includes a lens 160 and a lens mounting structure 162. Particular details regarding the lens 160, including optical properties, are described in co-pending application Ser. No. 15/679,571, filed Aug. 17, 2017 and entitled "FRESNEL LENS ARRAY WITH IMPROVED OFF-AXIS OPTICAL EFFICIENCY WITH IMPROVED OFF-AXIS OPTICAL EFFICIENCY", which application is incorporated herein by reference in its entirety. In some cases, the lens mounting structure 162 includes a side wall 164 that extends back from the lens 160 and is configured to contact and/or engage the front side 130*a* of the bracket 130. In some cases, as illustrated, the side wall 164 extends around a periphery of the lens 160, and engages the front side 130*a* of the bracket 130. The side wall 164 may add significant rigidity to the lens 160. In some cases, as shown, the lens mounting structure 162 may include a pair of lens retention hooks 166 extending back from the side wall 164 as shown.

In some cases, the lens 160 is a Fresnel lens, although this is not required. In some cases, the entire lens member 126, including the lens 160 and the lens mounting structure 162 may be made of a polymeric material such as but not limited to high density polyethylene (HDPE). While HDPE has desirable optical properties, HDPE is a relatively flexible polymer. As a result, if the lens retention hooks 166 are made of HDPE, they are easily flexed out of contact with the back side 130*b* of the bracket 130. The Fresnel lens may have a thickness of less than about 1 millimeter (mm), sometimes in the range of 0.6 mm to 0.7 mm. When the lens member 126 is injection molded out of HDPE as a one piece unit, the lens member 126 may be less than robust, and may tend to deform especially if placed under stress. To help increase the robustness of the connection between the lens member 126 and the bracket 130, the bracket 130 may include the lens securement springs 150*b*, 152*b*. The bracket 130, and thus the lens securement springs 150*b*, 152 may be made of a relatively stronger polymer (e.g. than the HDPE) such as but not limited to ABS (acrylonitrile butadiene styrene) or polycarbonate.

Returning to FIG. 8, it will be appreciated that when placing the lens member 126 in position relative to the bracket 130, the lens retention hooks 166 can be extended into the first lens securement aperture 150*a* and the second lens securement aperture 152*a*, respectively. Each of the lens retention hooks 166 include a flat back side 166*a* and a hook feature 166*b*. The flat back side 166*a* of each of the lens retention hooks 166 can slide past the corresponding first lens securement spring 150*b* and the second lens securement spring 152*b*, respectively. The hook feature 166*b* of each of the lens retention hooks 166 can extend through the corresponding first lens securement aperture 150*a* and the second lens securement aperture 152*a*, respectively, and engage the back side 130*b* of the bracket 130. This can be seen in FIG. 10, which shows a cross-sectional side view of the lens member 126 secured relative to the bracket 130.

In some cases, the first lens securement spring 150*b* is biased towards the first side 150 and the second lens securement spring 152*b* is biased towards the second side 152 such that the first lens securement spring 150*b* provides a biasing force, against the lens retention hook 166 disposed within the first lens securement aperture 150*a*, towards the first side 150 in order to hold the hook feature 166*b* in position against the back side 130*b* of the bracket 130, and the second lens securement spring 152*b* provides a biasing force against the lens retention hook 166 disposed within the second lens securement aperture 152*a* towards the second side 152 in order to hold the hook feature 166*b* in position against the back side 130*b* of the bracket 130. In some instances, the hook features 166*b* engages a bracket engagement surface 150*c* on the first side 150 of the bracket 130 and a bracket engagement surface 152*c* on the second side 152 of the bracket 130, respectively.

In some cases, the addition of the lens securement springs 150*b*, 152*b* provide a substantial benefit in retention forces. In a particular example, the addition of the lens securement springs 150*b*, 152*b* provides about a five-fold increase in pull-out load necessary to disengage the lens retention hooks 166. For example, with lens securement springs 150*b*, 152*b*, the lens member 126 may require a pull-out load of 16.6 Newtons (N) while the same lens member 126 without the lens securement springs 150*b*, 152*b* may release with a pull-out load of only 3.26 N. The lens securement springs 150*b*, 152*b* may provide about a four-fold increase in side-load necessary to disengage the lens retention hooks, improving from a side-load of only 0.74N to a side-load of 2.8 N.

It should be understood that this disclosure is, in many respects, only illustrative. Changes may be made in details, particularly in matters of shape, size, and arrangement of steps without exceeding the scope of the disclosure. This may include, to the extent that it is appropriate, the use of any of the features of one example embodiment being used in other embodiments.

What is claimed is:

1. A thermostat configured to provide one or more control signals to a building control system, the thermostat comprising:
   a housing;
   a user interface that is accessible from outside of the housing;
   a printed circuit board situated inside of the housing;
   a motion sensor for sensing motion in front of the housing, the motion sensor is mounted to the printed circuit board;
   a temperature sensor for sensing a temperature;
   a memory for storing a temperature setpoint;
   a controller operatively coupled to the user interface, the memory, the temperature sensor and the motion sensor, the controller configured to provide one or more control signals to the building control system that are based at least in part on the temperature setpoint, the temperature sensed by the temperature sensor, and the motion sensed by the motion sensor;
   a lens member including a lens and a lens mounting structure, the lens member is mounted such that the entire lens forms a continuous region of a front exterior surface of the thermostat and the entirety of the lens is directly accessible from the front exterior of the thermostat, the lens is positioned in front of the motion sensor, and wherein the lens and the lens mounting structure comprises high density polyethylene (HDPE) and the lens is configured to direct incoming electromagnetic radiation to the motion sensor;
   a bracket situated inside of the housing, the bracket defining an aperture in registration with the motion sensor for passing incoming electromagnetic radiation from the lens to the motion sensor, the aperture defined by side walls that are stepped to reduce unwanted reflections from reaching the motion sensor;
   the bracket further defining a lens securement aperture and a lens securement spring;
   the lens mounting structure comprising:
      a side wall that extend back relative to the lens and engages a front side of the bracket; and
      a lens retention hook that extends back from the side wall and through the lens securement aperture of the bracket and engages a back side of the bracket, wherein the lens securement spring of the bracket is configured to keep the lens retention hook in position against the back side of the bracket.

2. The thermostat of claim 1, wherein the side wall of the lens mounting structure extends around a perimeter of the lens.

3. The thermostat of claim 1, wherein the lens mounting structure comprises two lens retention hooks, and the bracket comprises two lens securement apertures each for receiving a corresponding one of the lens retention hooks and two lens securement springs each for keeping a corresponding one of the lens retention hooks in position.

4. The thermostat of claim 1, wherein the bracket is mounted to the printed circuit board.

5. The thermostat of claim 1, wherein the lens is a Fresnel lens.

6. The thermostat of claim 1, wherein the motion sensor senses motion in the infrared band.

7. The thermostat of claim 1, wherein the motion sensor senses motion in the far infrared band.

8. The thermostat of claim 1, wherein the lens member, including the lens and the lens mounting structure, is one piece and made from high density polyethylene (HDPE).

9. The thermostat of claim 1, wherein the lens retention hook includes a first side facing away from the motion sensor and a second side facing toward the motion sensor, the lens retention hook includes a hook feature that extends out away from the first side of the lens retention hook and is configured to engage the back side of the bracket, and wherein the lens securement spring of the bracket is configured to engage the second side of the lens retention hook to keep the hook feature engaged with the back side of the bracket.

10. An assembly for sensing motion in a space, comprising:
    a housing;
    a motion sensor for sensing motion in front of the housing;
    a transmitter for transmitting one or more signals that are based at least in part on the motion sensed by the motion sensor to a building automation system;
    a lens member including a lens and a lens mounting structure, the lens member is mounted with the entire lens forming a continuous region of a front exterior surface of the housing and accessible from the front exterior of the assembly free from any obstruction, the lens positioned in front of the motion sensor, the lens comprises high density polyethylene (HDPE) and is configured to direct incoming infra-red (IR) electromagnetic radiation to the motion sensor;
    a bracket situated inside of the housing, the bracket defining an aperture in registration with the motion sensor for passing incoming IR electromagnetic radiation from the lens to the motion sensor;
    the bracket further defining a lens securement aperture and a lens securement spring;
    the lens mounting structure comprising a side wall that extends backward from the lens and around a perimeter of the lens to add rigidity to the lens member, the lens mounting structure also comprising a lens retention hook that extends backward from the side wall and through the lens securement aperture to engage a back side of the bracket; and
    wherein the lens securement spring is sufficiently resilient to deflect away from the lens retention hook to enable the lens retention hook to extend past the lens securement spring, but is biased into contact with the lens retention hook to keep the lens retention hook engaged with the back side of the bracket.

11. The assembly of claim 10, wherein the lens comprises a Fresnel lens.

12. The assembly of claim 10, wherein the motion sensor senses motion in the infrared band.

13. The assembly of claim 10, wherein the lens member, including the lens and the lens mounting structure, is one piece.

14. The assembly of claim 10, wherein the lens securement spring extends from the bracket into the lens securement aperture.

15. The assembly of claim 10, wherein the lens securement spring extends into the lens securement aperture from a position proximate the aperture in the bracket.

16. The assembly of claim 10, wherein the lens securement spring has a constrained end where the lens securement spring extends from the bracket and a free end extending into the lens securement aperture.

17. A heating, cooling and ventilation (HVAC) controller configured to provide one or more control signals to an HVAC system, the HVAC controller comprising:
   a housing;
   a user interface that is accessible from outside of the housing;
   a motion sensor for sensing motion in front of the housing;
   a controller operatively coupled to the user interface and the motion sensor, the controller configured to provide one or more control signals to the HVAC system that are based at least in part on the motion sensed by the motion sensor;
   a bracket disposable within the housing, the bracket defining:
      an infrared light aperture configured to permit infrared light to pass through the infrared light aperture;
      a first lens securement aperture on a first side of the infrared light aperture;
      a first lens securement spring extending into the first lens securement aperture;
      a second lens securement aperture on a second side of the infrared light aperture; and
      a second lens securement spring extending into the second lens securement aperture;
   the motion sensor is secured relative to the bracket and operably coupled to the controller, the motion sensor configured to detect motion relative to the HVAC controller; and
   a lens member including a lens and a lens mounting structure, wherein the lens member is mounted such that the entire lens forms a continuous region of a front exterior surface of the housing and the entirety of the lens is directly accessible from the front exterior of the HVAC controller, the lens is disposed in front of the motion sensor and is configured to direct incoming infra-red light to the motion sensor, the lens mounting structure including a first lens retention hook that extends into the first lens securement aperture and a second lens retention hook that extends into the second lens securement aperture;
   wherein the first lens securement spring exerts a biasing force in a first direction against the first lens retention hook and the second lens securement spring exerts a biasing force in a second direction again the second lens retention hook, where the second direction is opposite the first direction.

18. The HVAC controller of claim 17, wherein the infra-red light aperture comprises side walls defined within the bracket, and the side walls are stepped.

19. The HVAC controller of claim 17, wherein the lens comprises a Fresnel lens, and the lens comprises high density polyethylene (HDPE).

20. The HVAC controller of claim 17, wherein the first lens securement spring extends into the first lens securement aperture angled in the first direction and the second lens securement spring extends into the second lens securement aperture angled in the second direction.

* * * * *